US012676922B2

(12) United States Patent
Storey et al.

(10) Patent No.:  US 12,676,922 B2
(45) Date of Patent:  Jul. 7, 2026

(54) PROTECTIVE CASE FOR MOBILE DEVICE

(71) Applicant: GEORGE TFE SCP, Monaco (MC)

(72) Inventors: Piers Christian Storey, Monaco (MC); Brendan Hingston Lake, Venice, CA (US)

(73) Assignee: GEORGE TFE SCP, Monaco (MO)

( * ) Notice: Subject to any disclaimer, the term of this patent is extended or adjusted under 35 U.S.C. 154(b) by 294 days.

(21) Appl. No.: 18/567,351

(22) PCT Filed: Jun. 12, 2021

(86) PCT No.: PCT/IB2021/055192
§ 371 (c)(1),
(2) Date: Dec. 5, 2023

(87) PCT Pub. No.: WO2022/259029
PCT Pub. Date: Dec. 15, 2022

(65) Prior Publication Data
US 2024/0275421 A1     Aug. 15, 2024

(51) Int. Cl.
H04M 1/02          (2006.01)

(52) U.S. Cl.
CPC ................................ H04M 1/0203 (2025.01)

(58) Field of Classification Search
CPC .... H04M 1/0203; H04M 1/185; H04B 1/3888
See application file for complete search history.

(56) References Cited

U.S. PATENT DOCUMENTS 8,706,176 B1      4/2014  Jia
9,179,558 B1 *  11/2015  Limber ................. G06F 1/1626

| 10,097,677 | B1 | 10/2018 | Balourdet | |
| 10,709,220 | B2 * | 7/2020 | Poon ..................... | H04B 1/3888 |
| 2011/0228459 | A1 * | 9/2011 | Richardson .......... | H04M 1/185 |
| | | | | 361/679.01 |
| 2013/0273944 | A1 * | 10/2013 | Wilson ................. | H04M 1/026 |
| | | | | 455/457 |
| 2014/0361130 | A1 * | 12/2014 | Fenton ................ | F16M 11/041 |
| | | | | 248/176.1 |
| 2015/0175330 | A1 * | 6/2015 | Ellis ..................... | H04M 1/185 |
| | | | | 206/521 |
| 2015/0331456 | A1 * | 11/2015 | Moon ................... | G06F 1/1656 |
| | | | | 361/679.55 |
| 2016/0080024 | A1 | 3/2016 | Wilson | |
| 2016/0197638 | A1 * | 7/2016 | Demnard ............. | H04B 1/3888 |
| | | | | 455/575.8 |
| 2016/0198681 | A1 * | 7/2016 | Fyfe ...................... | A45C 11/00 |
| | | | | 361/679.01 |
| 2017/0201285 | A1 * | 7/2017 | Liu ...................... | H04B 1/3888 |
| 2019/0372615 | A1 * | 12/2019 | Hutchinson .......... | A45C 11/002 |
| 2019/0384940 | A1 | 12/2019 | Fernandez | |
| 2020/0288833 | A1 * | 9/2020 | Fathollahi .............. | A45C 11/00 |
| 2020/0351396 | A1 * | 11/2020 | Poon ....................... | H04M 1/04 |

FOREIGN PATENT DOCUMENTS

| CN | 209805910 | 12/2019 |
| EP | 2850963 | 1/2010 |

* cited by examiner

*Primary Examiner* — Nicholas Pachol

(74) *Attorney, Agent, or Firm* — Jason L DeFrancesco

(57)          ABSTRACT

A protective case (1) configured to reversibly receive and retain a mobile device (10) comprising a rigid chassis (2) configured to receive the mobile device (10); a plurality of shock-absorbing bumpers (3) shaped to interlock with respective portions of said chassis (2).

16 Claims, 9 Drawing Sheets

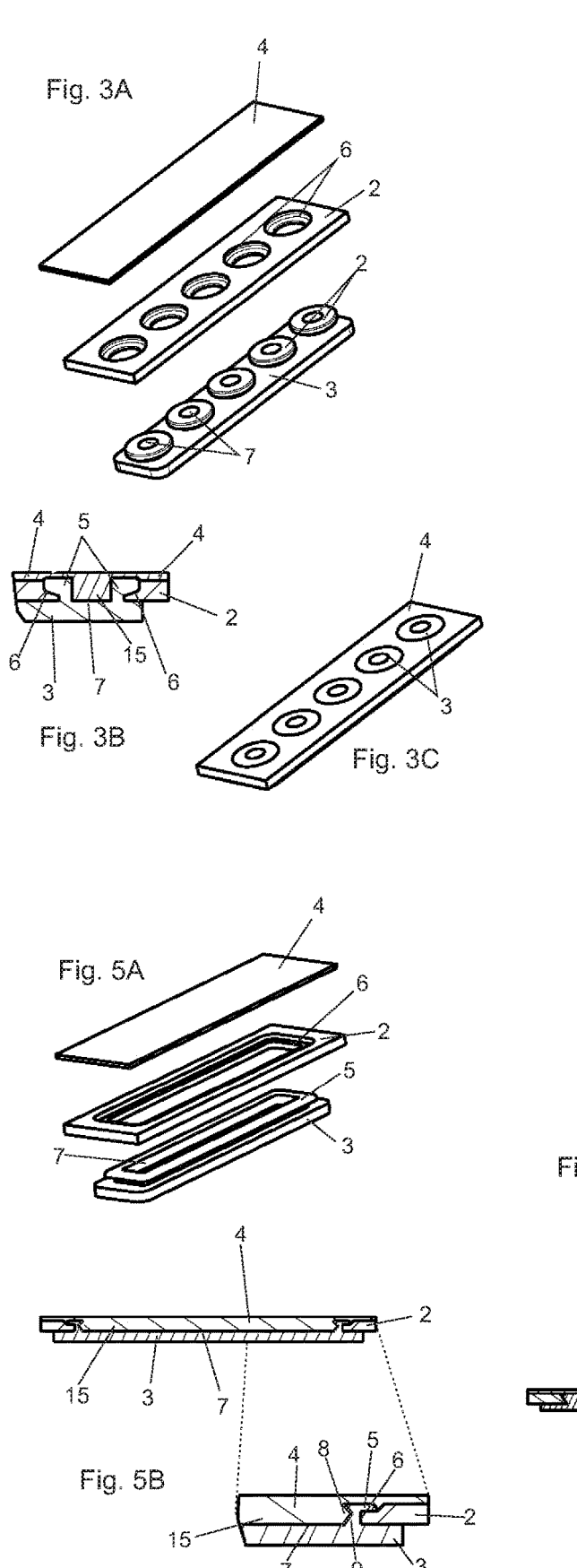
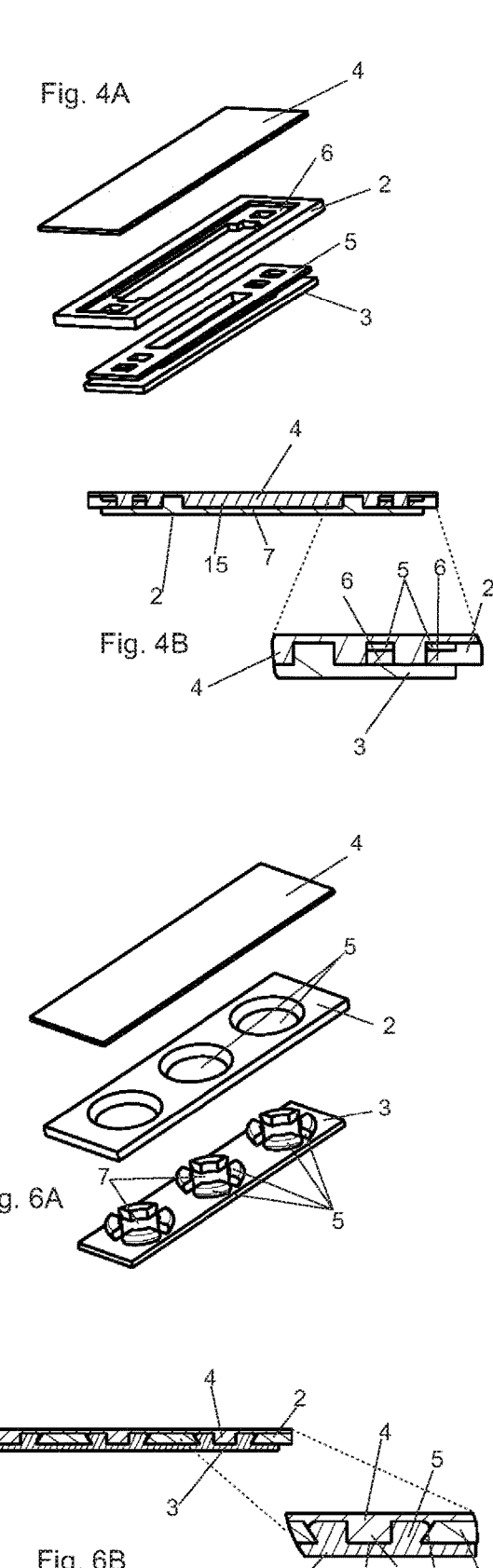
Fig. 3A
Fig. 3B
Fig. 3C
Fig. 4A
Fig. 4B
Fig. 5A
Fig. 5B
Fig. 6A
Fig. 6B

1

2

3

6

4

5

2

3

5

3

1

2

14

6

4

14

6

3

2

13

3

3

2

6

4

3

5

5

5

4   16

PROTECTIVE CASE FOR MOBILE DEVICE

TECHNICAL FIELD

The present invention relates to the field of protective casings for portable electronic devices. Preferably, it relates to protective covers for handling electronic devices, such as smartphones.

BACKGROUND ART

In the state of the art protective shells or covers for mobile devices or mobile equipments, such as mobile phones, remote controls, tablets, and similar devices are known. These kinds of covers or shells are normally made of plastic or rubber. These well-known covers protect the rear and lateral sides of a mobile device, leaving the front face accessible to operate the device.

These covers are mainly configured to protect the mobile device in case of fall.

An example in this sense is provided by the document U.S. Pat. No. 8,706,176B1 which comprises an inner hard shell with a soft external shell.

On the contrary, the solution of document EP2850963B1 comprises an outer hard shell connected to an inner elastomeric liner.

Available solutions do not efficiently absorb the energy deriving from an impact. If a mobile device having a protective cover falls, the risk of damaging the internal components of the device is still very high.

Known elastomeric covers/shells are used to soften impacts by absorbing energy elastically, but elastic materials generate rebound forces during the impact that are transmitted to the inner components of the mobile device. This kind of force can consequently damage the mobile device even if its external casing remains intact.

Furthermore, a solution that allows a quick disassembling of the protective cover for checking its structural integrity is absent.

Finally, it is desirable a solution that solves the above-mentioned problems and has a nice appearance and compact size.

No one of the solutions available in the state of art solves all above-mentioned problems.

SUMMARY

Said inconvenients of the state of the art are now solved by a protective case configured to reversibly receive and retain a mobile device comprising a rigid chassis configured to receive the mobile device; a plurality of shock-absorbing bumpers shaped to interlock with respective portions of said chassis. The shock-absorbing bumpers allow to efficiently absorb the energy of an impact in the most sensitive areas of the mobile device. Moreover, the interlocking connections allow to quickly assemble the protective case. Consequently, the protective case so conceived is cheaper because it optimizes the energy-absorption with small, localised bumpers and it is easier to manufacture. Moreover, being the bumpers independent from the chassis, they can be easily adapted to different types of chassis. For example rigid chassis suitable for different sizes/brands of smartphone can use the same kind of bumper/s. In this way, the manufacturing costs are decreased without detriment to the structural resistance of the protective case.

The protective case can also comprise an outer layer configured to cover an outer face of the rigid chassis. This outer layer protects the chassis and provides better ergonomics and appearance to the protective case.

The chassis can be made of a material at least partially incompatible with the material/s of the shock-absorbing bumpers and/or of the outer layer. The interlocking connections allow to bond incompatible elements of the protective case together. This is particularly important if the bumpers are made of a material that has high energy-absorbing properties, like silicon or polymer-based dilatant which are often incompatible with other materials.

In particular, at least one shock-absorbing bumper can comprise one or more hooks configured to snap-fasten with said portions of the chassis. Preferably said portions being grooves. The hooks of the bumpers and the grooves of the chassis cooperate enabling a reversible and quick coupling and assembling of the protective case. Alternatively, the chassis can comprise a plurality of hooks configured to snap-fasten with respective grooves of the shock-absorbing bumpers, obtaining the same effect.

Preferably, at least one shock-absorbing bumper can be shaped so as to form a cavity. This cavity allows to make the hooks more flexible, since they can bend inwardly. This flexibility allows an easier interlocking between the chassis and the bumpers.

Advantageously, the outer layer is shaped so as to fill one or more of said cavities of the shock-absorbing bumpers for preventing a disconnection between the shock-absorbing bumper and the chassis. The outer layer is inserted in said cavities in order to prevent the inward bending of the hooks. In this way the hooks remain mechanically engaged with the grooves and the bumpers get stuck to chassis. Substantially, the outer layer is shaped so as to lock the hooks of the bumpers against the grooves of the chassis.

In particular, the outer layer is overmolded over the chassis. This kind of connection between the chassis and the outer layer is more stable, in particular if the outer layer can be in direct contact with the material of the bumpers. Since the chassis can be made of a material that is incompatible with one or both the materials of the outer layer and the bumpers, a direct connection of the outer layer with the bumpers can allow to entrap the chassis between them.

Alternatively, the outer layer can comprise a plurality of indents configured to mechanically engage with respective undercuts of the shock-absorbing bumpers. In this case, the outer layer snap-fits with the bumpers to interlock the outer layer with the bumpers, preferably clamping the chassis between them. This kind of connection is reversible and allows to dismount the protective case for changing the bumpers if collapsed or the outer layer if ruined. Alternatively, the outer layer can comprise a plurality of undercuts configured to mechanically engage with respective indents of the shock-absorbing bumpers.

Advantageously, one of the chassis or outer layer can be configured to retain the mobile device. The shape of the chassis or outer layer is such that the mobile device remains anchored inside the protective case.

Preferably, one or more of the shock-absorbing bumpers can comprise an array of energy-absorbing open-cells encapsulated in an elastic carrier material. This kind of shock-absorbing bumper has a great impact-energy to thickness ratio, thus allows to maximize the impact energy absorbed despite a small thickness.

Alternatively, one or more of the shock-absorbing bumpers can comprise polymer-based dilatant. This kind of bumpers allow to absorb a great amount of impact energy. Said interlocking connections allow to employ this kind of material with a rigid chassis that is incompatible with polymer-based dilatant materials.

Preferably, one or more of shock-absorbing bumpers can be made at least in part of silicone or an elastomer, more preferably a thermoplastic elastomer. These materials are elastic and make the bumpers deformable. This deformation allows an easy connection of the hooks with the chassis.

In particular, the outer layer and the shock-absorbing bumpers can be made of compatible materials. Being the materials of bumpers and outer layer compatible, a direct overmoulding between them is facilitated.

Preferably, the shock-absorbing bumpers can be interlocked to the chassis so to face inward, thus toward the area wherein the mobile device can be accommodated. In this way, the bumpers can contact directly the mobile device, preventing a transmission of the impact energy to the shell of the mobile device and to its inner electronic components.

Alternatively, one or more of shock-absorbing bumpers can be at least in part clamped between the chassis and the outer layer so that bumpers cannot come out from the chassis.

These and other advantages will be better understood thanks to the following description of different embodiments of said invention given as non-limitative examples thereof, making reference to the annexed drawings.

DRAWINGS DESCRIPTION

In the drawings:

FIG. 3A shows an axonometric exploded schematic view of a first type of interlocking between the outer layer, the chassis and the shock-absorbing bumper according to the present invention;

FIG. 3B shows a detailed lateral sectional view of the first type of interlocking according to the present invention;

FIG. 3C shows an axonometric view of the first type of interlocking according to the present invention;

FIG. 4A shows an axonometric exploded schematic view of a second type of interlocking between the outer layer, the chassis and the shock-absorbing bumper according to the present invention;

FIG. 4B shows a lateral sectional view with a corresponding detailed view of the second type of interlocking according to the present invention;

FIG. 5A shows an axonometric exploded schematic view of a third type of interlocking between the outer layer, the chassis and the shock-absorbing bumper according to the present invention;

FIG. 5B shows a lateral sectional view with a corresponding detailed view of the third type of interlocking according to the present invention;

FIG. 6A shows an axonometric exploded schematic view of a fourth type of interlocking between the outer layer, the chassis and the shock-absorbing bumper according to the present invention;

FIG. 6B shows a lateral sectional view with a corresponding detailed view of the fourth type of interlocking according to the present invention;

DETAILED DESCRIPTION

The following description of one or more embodiments of the invention is referred to the annexed drawings. The same reference numbers indicate equal or similar parts. The object of the protection is defined by the annexed claims. Technical details, structures or characteristics of the solutions herebelow described can be combined with each other in any suitable way.

Figures 10A, 10B, 10C, 10D, 10E, 10F:
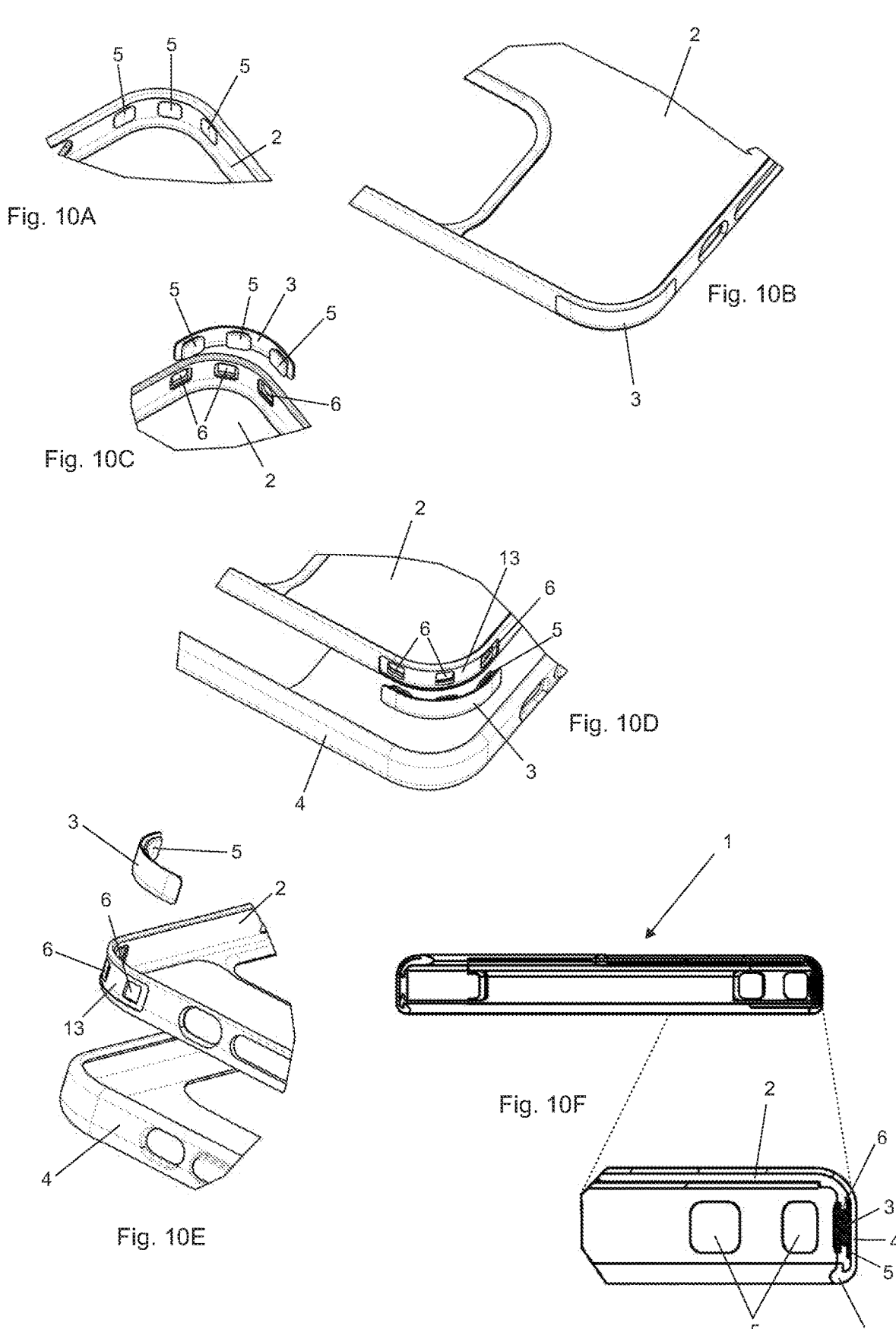
FIG. 10A shows an axonometric view of a corner of a chassis on which a shock-absorbing bumper is installed according to a sixth embodiment of the present invention.
FIG. 10B shows a further axonometric view of a corner of a chassis on which a shock-absorbing bumper is installed according to the sixth embodiment of the present invention.
FIG. 10C shows an axonometric exploded view of a corner of a chassis on which a shock-absorbing bumper is installed according to the sixth embodiment of the present invention.
FIG. 10D shows a further axonometric exploded view of a corner of a protective case according to the sixth embodiment of the present invention.
FIG. 10E shows a further axonometric exploded view of a corner of a protective case according to the sixth embodiment of the present invention.
FIG. 10F shows a lateral sectional view of a protective case according to a sixth embodiment of the present invention, with a detailed view of the portion wherein the shock-absorbing bumper is installed.

FIG. 1 show a first embodiment of the present invention, FIG. 2 show a second embodiment of the present invention, FIG. 7 show a third embodiment of the present invention, FIG. 8 show a fourth embodiment of the present invention, FIG. 9 show a fifth embodiment of the present invention, FIG. 10 show a sixth embodiment of the present invention, FIG. 11 show a seventh embodiment of the present invention, FIG. 12 show a eighth embodiment of the present invention.

FIG. 3 show a first type of interconnection between the elements of the protective case 1, FIG. 4 show a second type of interconnection between the elements of the protective case 1, FIG. 5 show a third type of interconnection between the elements of the protective case 1, and FIG. 6 show a fourth type of interconnection between the elements of the protective case 1.

Figure 13A:
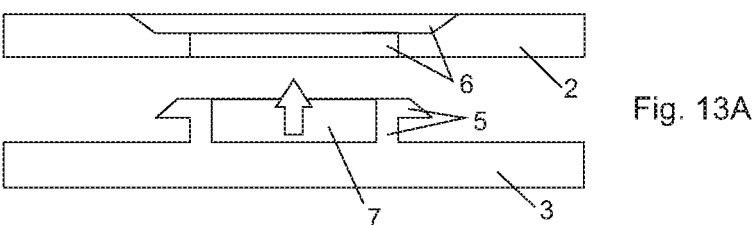
FIG. 13A shows a lateral sectional view of a bumper to be inserted in a chassis of a protective case according to the present invention.
Figure 13B:
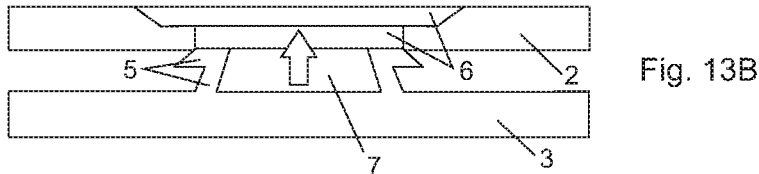
FIG. 13B shows a lateral sectional view of a bumper entering in a chassis of a protective case according to the present invention.
Figure 13C:
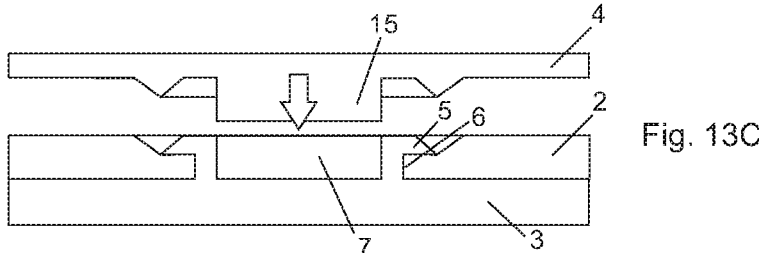
FIG. 13C shows a lateral sectional view of a bumper inserted in a chassis of a protective case according to the present invention and an outer layer entering in the bumper.
Figure 13D:
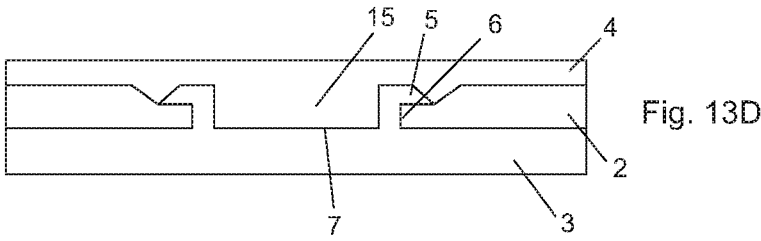
FIG. 13D shows a lateral sectional view of a protective case according to the present invention wherein the bumpers, the casing and outer layer are coupled together.
Figure 14:
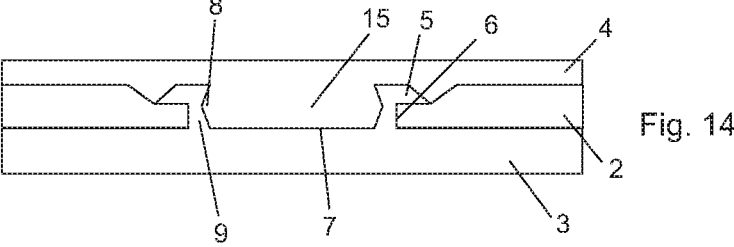
FIG. 14 shows a lateral sectional view of a protective case according to an alternative embodiment with respect to the protective case of FIG. 12D.

FIGS. 13 and 14 show how the interconnection between the elements of the protective case 1 is realized.

In particular, FIG. 1 represent an embodiment wherein the shock-absorbing bumpers 3 face inward and the interlocking between the bumpers 3 and chassis 2 is realized through hooks 5 belonging to the bumpers 3 and grooves 6 belonging to the chassis 2. In particular, the hooks 5 of the shock-absorbing bumpers 3 have not a cavity. FIG. 2 represent an embodiment wherein the interlocking between bumpers 3 and chassis 2 is realized with hooks 5 of the bumpers 3 and grooves 6 of the chassis 2. In particular, the hooks 5 of the shock-absorbing bumpers 3 have a cavity similar to that of the first type of interconnection of FIG. 3. FIG. 7 represent an embodiment wherein the shock-absorbing bumpers 3 have pass-through holes and the chassis 2 comprises a plurality of pins. FIG. 8 represent an embodiment wherein the outer layer is absent. FIG. 9 represent an embodiment similar to that of FIG. 8 wherein part of bumpers 3 is visible from outside the chassis 2. FIG. 10 represent an embodiment similar to that of FIGS. 1, wherein the shock-absorbing bumpers 3 face outward and the hooks 5 of the shock-absorbing bumpers 3 have not a cavity. FIG. 11 represent an embodiment similar to that of FIGS. 10, wherein the shock-absorbing bumpers 3 face outward and the outer layer 4 comprises some openings, and FIG. 12 represent an embodiment wherein the shock-absorbing bumpers 3 face outward similarly to the embodiment of FIG. 11, and wherein the backwall of the protective case 1 comprises a flat shock-absorbing bumpers 3.

The features of all these embodiments can be combined if compatible, for example the backwall shock-absorbing bumpers 3 of the embodiment of FIG. 12 can be employed in all the other embodiments.

In the following, the feature named "shock-absorbing bumper" 3 is often shortened as "bumper" 3.

In all the embodiments, the protective case 1 comprises a rigid chassis 2 and a plurality of shock-absorbing bumpers 3.

The protective case 1 can even include a single bumper 3, for example arranged only on the backwall.

All the embodiments except those of FIGS. 8 and 9 comprise a chassis 2, shock-absorbing bumpers 3 and an outer layer 4. The fourth and fifth embodiments of FIGS. 8 and 9 comprise only a chassis 2 and a plurality of bumpers 3, without an outer layer.

Figures 1A, 1B, 1C, 1D, 1E, 1F, 1G:
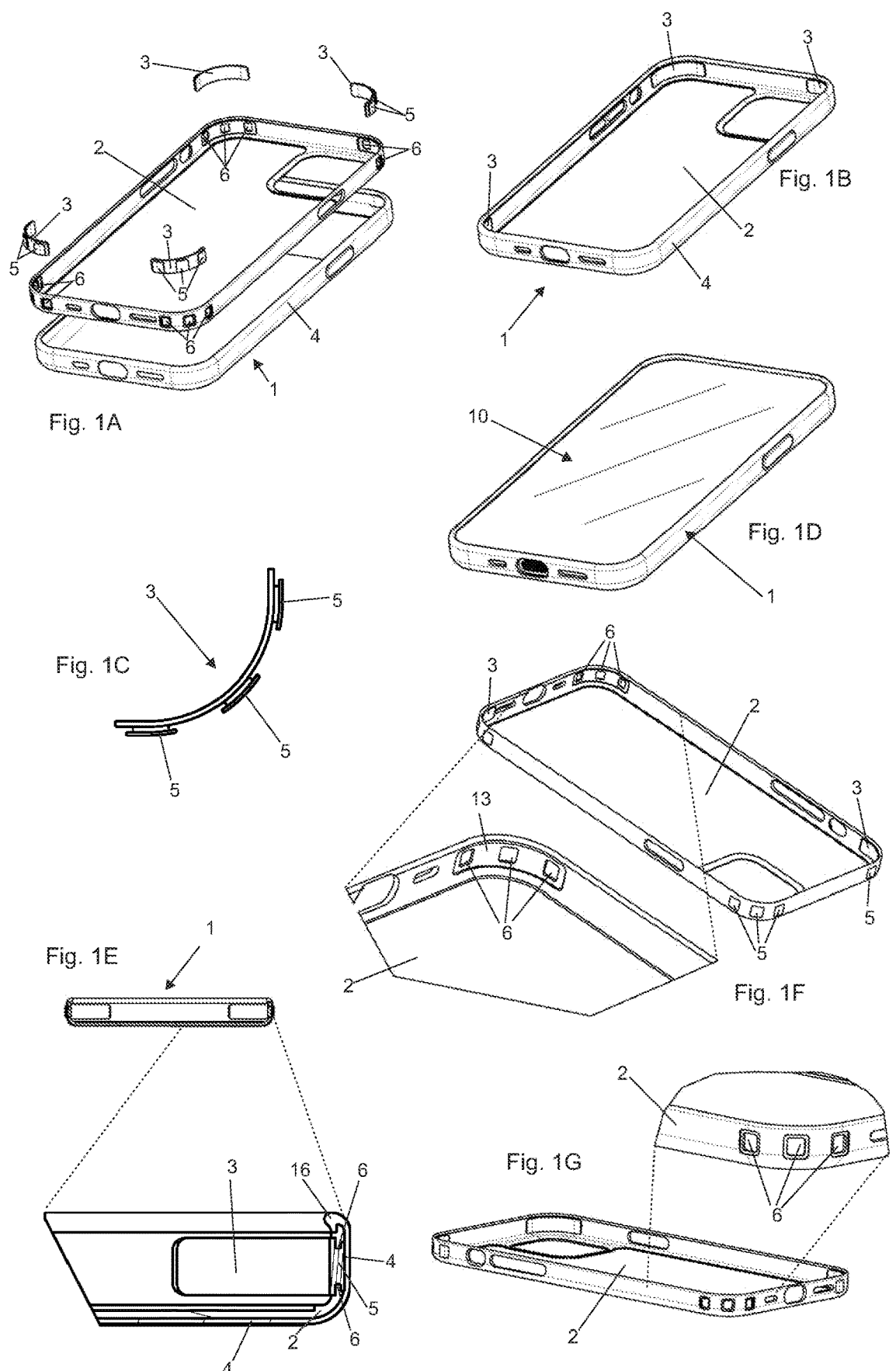
FIG. 1A shows an axonometric exploded view of a protective case according to a first embodiment of the present invention.
FIG. 1B shows an axonometric view of a protective case according to a first embodiment of the present invention.
FIG. 1C shows a top view of a shock-absorbing bumper of the protective case of FIG. 1B.
FIG. 1D shows an axonometric view of a protective case with a mobile device according to the present invention.
FIG. 1E shows a lateral sectional view of a protective case according to the first embodiment of the present invention.
FIG. 1F shows an axonometric view of chassis of the protective case of FIG. 1B with a detailed view of the portion wherein the shock-absorbing bumper can be installed.
FIG. 1G shows a further axonometric view of chassis of the protective case of FIG. 1B with a detailed view of the portion wherein the shock-absorbing bumper can be installed.

The chassis 2 is shaped to receive the mobile device 10, as shown in FIG. 1D. The combination of the mobile device 10 and the protective case 1 is shown only for the first embodiment, but it is intuitive how the mobile device 10 can be accommodated in the protective case 1 of all the other embodiments.

The outer layer 4 is configured to cover the outer face of the chassis 2. Indeed, the outer layer 4 is the element that can provide a soft-touch effect to the protective case 1 and allows a better grip with the user's hand.

Figures 8A, 8B, 8C, 8D, 9A, 9B, 9C:
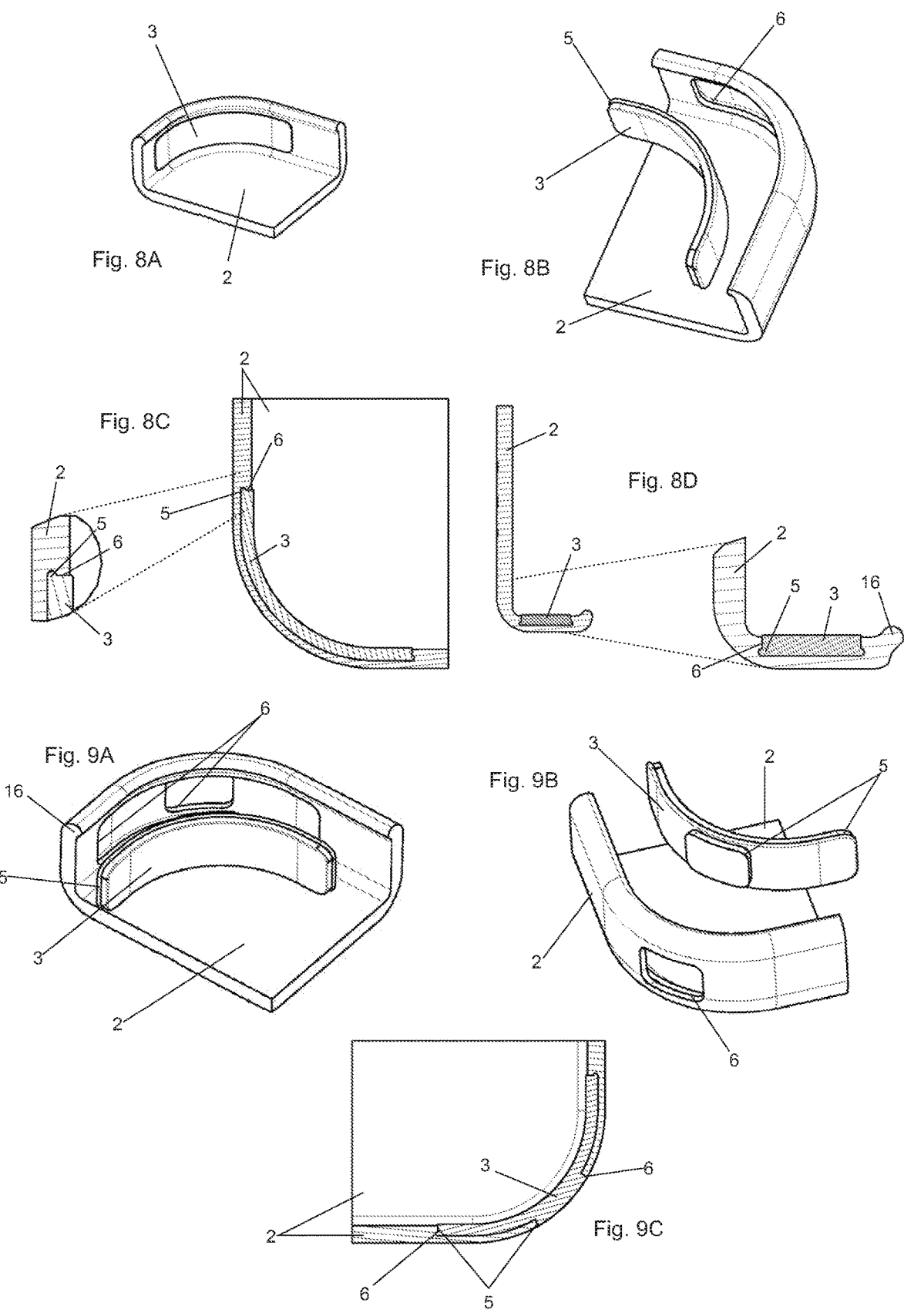
FIG. 8A shows an axonometric view of a corner of a protective case according to a fourth embodiment of the present invention.
FIG. 8B shows an axonometric exploded view of a corner of a protective case according to the fourth embodiment of the present invention.
FIG. 8C shows a front sectional view of a corner of a protective case according to the fourth embodiment of the present invention, with a detailed view of the portion wherein the shock-absorbing bumper is installed.
FIG. 8D shows a lateral sectional view of a protective case according to the fourth embodiment of the present invention, with a detailed view of the portion wherein the shock-absorbing bumper is installed.
FIG. 9A shows an axonometric exploded view of a corner of a protective case according to the fifth embodiment of the present invention.
FIG. 9B shows an axonometric view of a corner of a protective case according to a fifth embodiment of the present invention.
FIG. 9C shows a front sectional view of a corner of a protective case according to the fifth embodiment of the present invention.

The outer layer 4 or the chassis 2 can comprise a perimeter ridge 16 for retaining the mobile device 10 into the protective case 1, this perimeter ridge 16 prevents a drop-off of the mobile device 10. The ridge 16 can be realized on the outer layer 4 as shown in FIGS. 1E, 2D, 10F, 11D or on the chassis 2 as shown in FIGS. 8D and 9A.

The bumpers 3 can be arranged so as to face inward, thus toward the mobile device 10, like in the embodiments of FIGS. 1, 2, 7, 8, 9 or arranged so as to face outward, thus toward the external, like in the embodiments of FIGS. 10, 11, 12. In the first case, the bumpers 3 can be in direct contact with the outer surface of the mobile device 10.

The bumpers 3 of all the embodiments are arranged in correspondence of the corners of the chassis 2, but the bumpers 3 can be arranged even over other portions of the chassis 2. For example the embodiment of FIG. 12 comprises a flat bumper 3 arranged on the backwall of the chassis 2.

This flat bumper 3 for the backwall of the chassis 2 can be arranged so to face inward as shown in FIG. 12 or, vice versa, so to face outward (embodiment not shown).

In all the embodiments, the bumpers 3 are shaped so to interlock with corresponding portions of the chassis 2. The bumpers 3 are thus mechanically coupled to the chassis 2.

This interlocking is realized through grooves 6 and hooks 5 respectively belonging to the chassis 2 and to the bumpers 3, which cooperate together to realize said coupling. Alternatively, the hooks 5 can belong to the chassis 2 and the grooves 6 to the bumpers 3.

In particular, in all the embodiments except that of FIGS. 7, the portions of the chassis 2 that snap-fasten with the hooks 5 of the bumpers 3 comprise grooves 6.

The grooves 6 and the hooks 5 are shaped so to be complementary.

In all the embodiments, the grooves 6 are recesses and the hooks 5 comprise protuberances complementarly shaped to these grooves 6. In this way, the mechanical coupling between the chassis 2 and bumpers 3 is stable. Preferably, the hook 5 comprises a straight body from which a tooth transversally extends.

In particular, the groove 6 can be a through hole as FIGS. 1, 2, 9, 10, 11, 12 and 13 shown or a blind hole, thus a pocket, like in the case of the fourth embodiment of FIG. 8.

In a further case, that is not shown in FIGS. 13, the chassis 2 can comprise protuberances, thus hooks, shaped so to be complementary to grooves realized on the bumpers 3.

In particular, with reference to FIG. 13 is represented how the interconnection between the chassis 2 and the bumper 3 is realized, and how the interconnection between the outer layer 4 and the chassis 2 and bumper 3 can be realized.

The bumper 3, the chassis 2 and the outer layer 4 of FIG. 13A-13D have a shape very similar to that of FIG. 3.

Specifically, the bumper 3 is inserted in the groove 6 of the chassis 2. The groove 6 of the chassis 2 represents the portion of the chassis 2 that snap-fastens with the bumper 3. The protuberance of the bumper 3 represents the hook 5.

The bumper 3 is at least in part made of a flexible material that allows to the hooks 5 to bend.

Figures 12A, 12B, 12C, 12D:
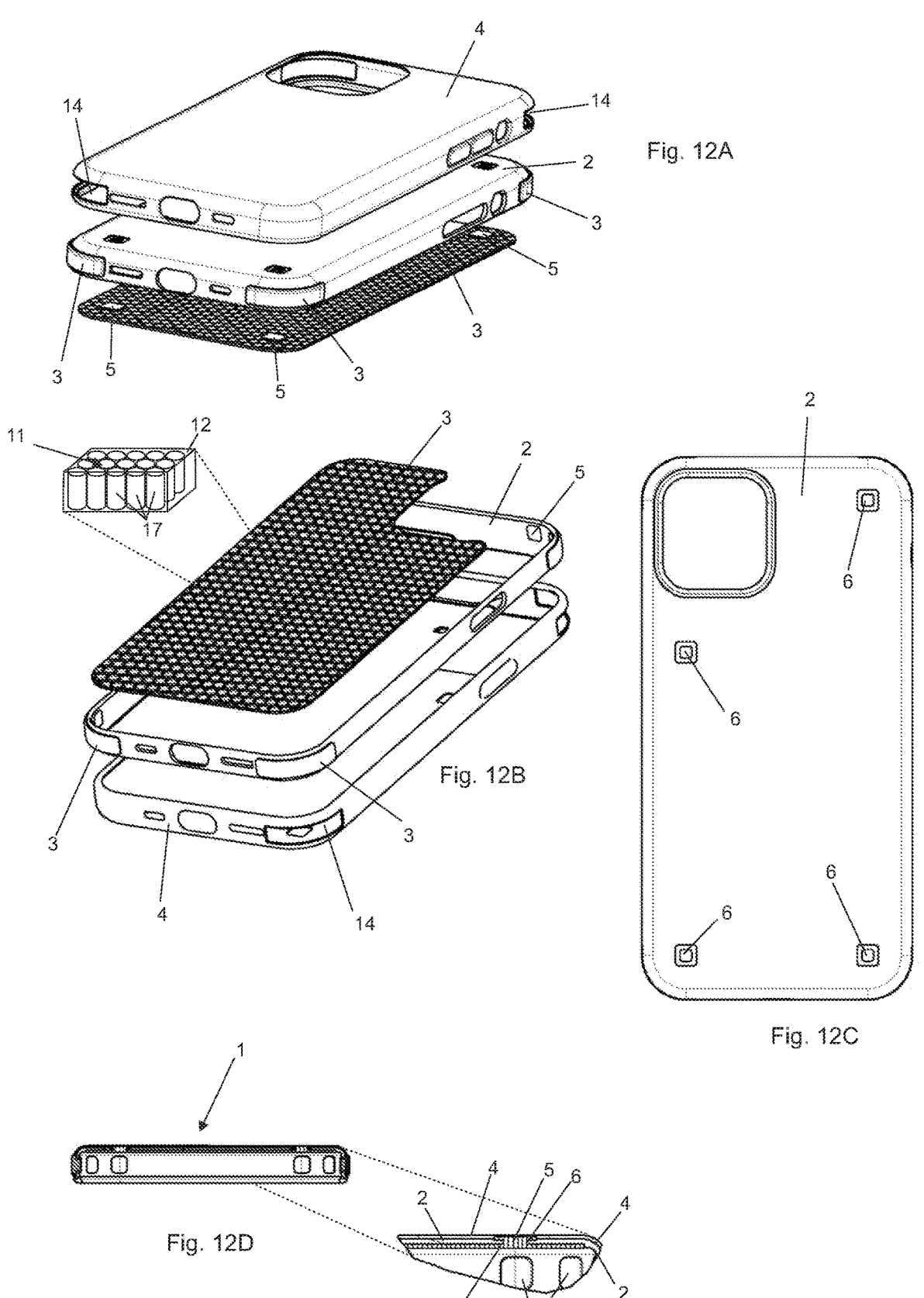
FIG. 12A shows an exploded axonometric view of a protective case according to an eighth embodiment of the present invention.
FIG. 12B shows a further exploded axonometric view of a protective case according to an eighth embodiment of the present invention.
FIG. 12C shows front view of a chassis of the protective case according to an eighth embodiment of the present invention.
FIG. 12D shows a lateral sectional view of a protective case according to an eighth embodiment of the present invention, with a detailed view of the portion wherein the shock-absorbing bumper is installed.

As shown in FIG. 12B, the hook 5 flexes so to enter in the groove 6. Once the hook 5 fully enters in the groove 6, a mechanical coupling is realized and the bumper 3 is coupled to the chassis 2, as shown in FIG. 13C.

In order to realize a stable interconnection between the bumper 3 and the chassis 2, each bumper 3 has more interlocking coupling like that described above. Alternatively, as described later on in the specification, the interlocking coupling can be only one but longer, like that of FIG. 4 or 5.

In the FIG. 13C is also represented an outer layer 4 (optional), which comprises a further protrusion 15 shaped so to enter and fill a cavity 7 that is arranged in the bumper 3. This cavity 7 is substantially a hole realized in correspondence of the hook 5. This cavity 7 allows an inward bending of the hook 5, as shown in FIG. 13B, and receives the protrusion 15 of the outer layer 4 once the chassis 2 and the bumper 3 are coupled.

The protrusion 15 of the outer layer 4 has a shape complementary to that of the cavity 7 so to fill it. Once that the protrusion 15 is inserted in the cavity 7, the hook 5 cannot bent inwardly and consequently the interlocking between the bumper 3 and the chassis 2 remains stable.

The outer layer 4 can be coupled to the bumper 3 in different ways. For example, the outer layer 4 can be overmoulded over the chassis 2 and the bumper 3, alternatively the outer layer 4 can be glued with them. Otherwise, the outer layer 4 can interlock with the bumper 3 as shown in FIG. 14.

In particular, if the outer layer 4 is overmoulded over the chassis 2 and bumper 3, the body of the outer layer 4 enters in contact with the bumper 3. In particular, if the cavity 7 is present, the surface of contact between the outer layer 4 and the bumper 3 is increased.

The materials of the bumper 3 and of the outer layer 4 are selected so to be compatible, thus co-mouldable. This means that the material of the bumper 3 and the material of the outer layer 4 are configured to realize a strong bonding if moulded together.

For example, the material of the bumper 3 can be a silicone or an elastomer, in particular TPE (thermoplastic elastomer). Similarly, even the material of the outer layer 4 can be a silicone or an elastomer, like TPE. In this way, if the material of the outer layer 4 is molded over the group constituted by the chassis 2 and the bumper 3, and the material of the outer layer 4 firmly bonds with the material of the bumper 3.

This feature is particularly important if the material of the chassis 2 is incompatible with the materials of the outer layer 4 and/or of the bumper 3. In this case, being the chassis 2 sandwiched between the bumper 3 and the outer layer 4 avoiding a disconnection due to said incompatibility. If the materials of the bumper 3 and of the outer layer 4 are compatible, the overmoulding of the former elements allows to entrap the chassis 2 between the outer layer 4 and the bumper 3, despite the incompatibility with the material of the chassis 2.

The material of the chassis 2 can be a hard plastic like polycarbonate or a metal, like an aluminium alloy. For this reason, the materials of the bumper 3 and/or outer layer 4 can be incompatible with that of the chassis 2.

Alternatively, the outer layer 4 can be glued or connected to the other elements with an adhesive intermediate layer.

In a further alternative, the outer layer 4 is shaped so to realized a further interlocking with respect to that between the chassis 2 and the bumper 3. With reference to FIG. 14, the outer layer 4 comprises an indent 8 that cooperates with a complementary undercut 9 of the bumper 3.

Therefore, similarly to the interlocking between the groove 6 of the chassis 2 and the hook 5 of the bumper 3, the outer layer 4 comprises an indent 8 and the bumper 3 comprises an undercut 9.

The indent 8 of the outer layer is complementarly shaped to the undercut 9 of the bumper 3 so to realize an interlocking connection between them. When the outer layer 4 is forced to enter in the cavity 7 of the bumper 3, a snap-joint between the indent 8 and the undercut 9 is realized.

The above description of FIGS. 13 and 14 applies to all the embodiments of the present invention, and explains the interconnection between the chassis 2 and the bumpers 3 and, if present, between the outer layer 4 and the bumpers 3 and chassis 2.

In particular, the above description of FIGS. 13 and 14 applies to the protective case 1 of the first, second, third, fourth and fifth embodiments. The sixth, seventh and eighth embodiments of the protective case 1 differ from the others, because the bumpers 3 are sandwiched between the outer layer 4 and the chassis 2, while in the first, second and third embodiments, the chassis 2 is sandwiched between the outer layer 4 and the bumpers 3. Vice versa, in the fourth and fifth embodiments the outer layer 4 is absent. Anyway, for the sixth, seventh and eighth embodiments, the type of interconnection is similar to that of FIGS. 13, with the only difference that the position of the bumper 3 and of the chassis 2 are inverted. Further details of this interlocking are provided in the following.

Other type of interlocking between the chassis 2 and the bumper 3 are shown in FIGS. 3-6. These types of interlocking connections are applicable to all the embodiments.

In particular, FIG. 3A comprises an outer layer 4, a chassis 2 and a bumper 3. The bumper 3 comprises a plurality of hooks 5 and the chassis 2 comprises a plurality of grooves 6. The grooves 6 are properly shaped holes, while the hooks 5 are protuberances complementary having cavities 7. As shown in FIG. 3B, the hook 5 enters in the hole (the groove 6) of the chassis 2 and snap-fastens with it. Then an outer layer 4 is arranged over the chassis 2 so to enter and fill the cavities 7 of the bumper 3. FIG. 3C shows a chassis 2 interlocked with a bumper 3 without an outer layer 4, that can be optional.

FIG. 4 represent a bumper 3 that comprises only one hook 5. This hook 5 cooperates with a corresponding groove 6 of the chassis 2. A detailed view of the interlocking connection realized is shown in FIG. 4B. The outer layer 4 is arranged over the other two elements on the outer side of the chassis 2.

FIG. 5 represent a type of interlocking similar to that of FIG. 4. The bumper 3 comprises only one long hook 5 with an inner cavity 7. The hook 5 is inserted in a hole of the chassis 2 constituting the groove 6. The outer layer 4 is then arranged over them as shown in FIG. 5B. In this type of interlocking, the outer layer 4 is interlocked with the bumper 3 through indents and undercuts 8, 9. The indent 8 of the outer layer 4 enters in the undercut 9 of the bumper 3 and matches with it.

FIG. 6 shows a type of interlocking that is similar to that of FIG. 3. In this case, the hooks 5 are not continuous, as shown in FIGS. 3, but discrete and comprise petals. Each petal can bend when enters in the groove 6. Between the petals of the hook 5 a cavity 7 is realized to accommodate the outer layer 4, as shown in FIG. 6B.

The first embodiment of FIG. 1 comprises four bumpers 3 arranged in the corners of the chassis 2. The bumper 3 is arc-shaped, as shown in FIG. 1C, and comprises three protuberances having corresponding heads that constitute respective hooks 5. The chassis 2 comprises a bottom and a perimeter sidewall that closes the bottom so to realize a container that can receive the mobile device 10. The sidewall of the chassis 2 comprises three pass-through holes in correspondence of each corner. These holes correspond to the grooves 6. These holes are shaped to be complementary to corresponding protuberances of the bumpers 3. The bumpers 3 are arranged on the inner side of said sidewall of the chassis 2 and the heads of the hooks 5 come up from said holes on the opposite side, as shown in FIG. 1F. An outer layer 4 covers the outer surface of the chassis 2. The outer layer 4 pushes the heads of the hooks 5 against the chassis 2 and prevent they come out from the chassis 2, as shown in FIG. 1E. The chassis 2 can comprises one or more openings for controlling the buttons/switches of the mobile device 10. The outer layer 4 is preferably made of a soft and flexible material for allowing a direct control of said buttons/ switches through the openings of the chassis 2. In order to accommodate the bumper 3, the inner side of the chassis 2 comprises four recesses 13 in the corners. In these recesses 13 respective bumpers 3 can be arranged. 6.

Figures 2A, 2B, 2C, 2D:
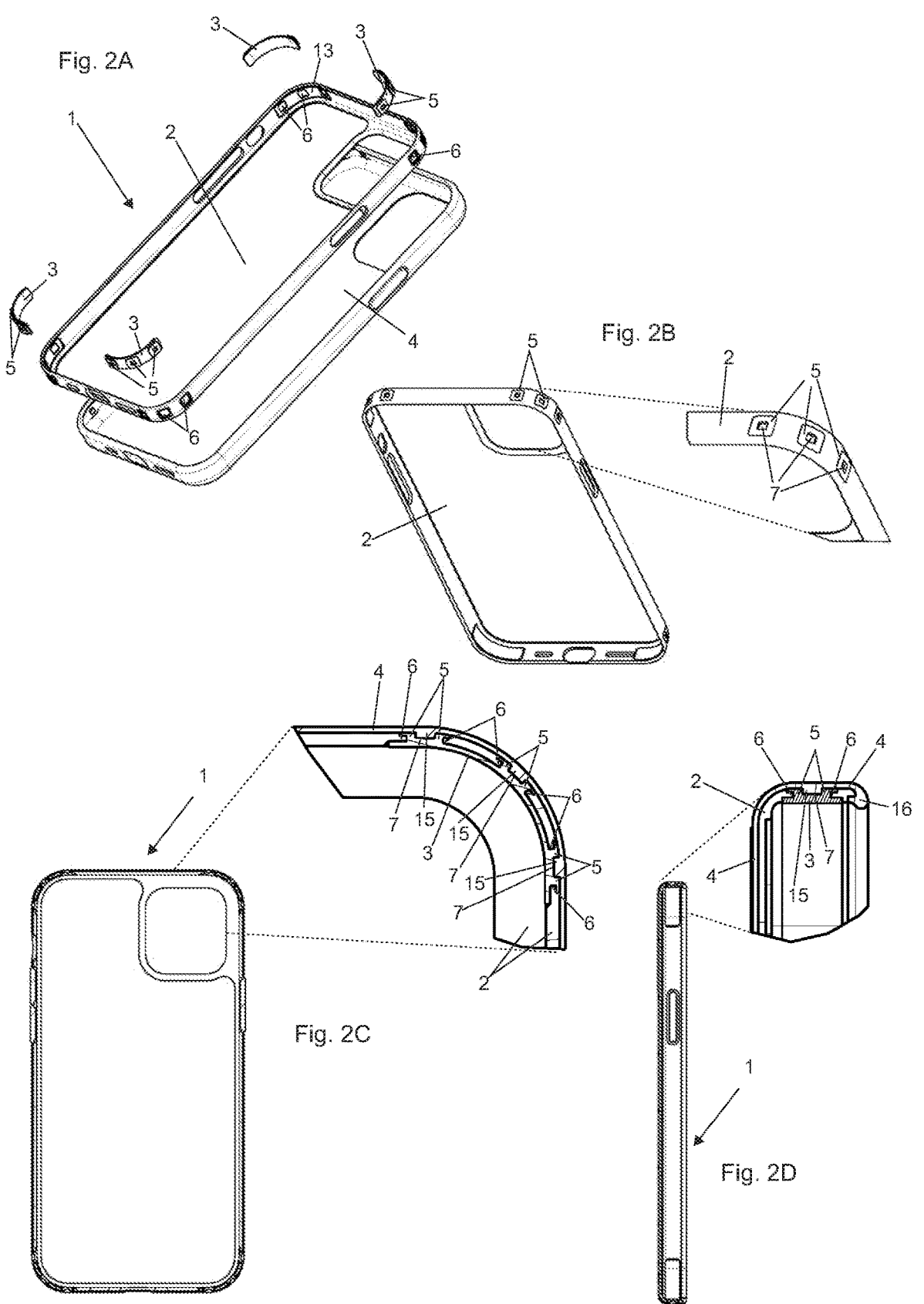
FIG. 2A shows an axonometric exploded view of a protective case according to a second embodiment of the present invention.
FIG. 2B shows an axonometric view of chassis of the protective case according to the second embodiment of the present invention with a detailed view of the portion wherein the shock-absorbing bumper can be installed.
FIG. 2C shows a front sectional view of a protective case according to the second embodiment of the present invention, with a detailed view of the portion wherein the shock-absorbing bumper is installed.
FIG. 2D shows a lateral sectional view of a protective case according to the second embodiment of the present invention, with a detailed view of the portion wherein the shock-absorbing bumper is installed.

The second embodiment of FIG. 2 is substantially equal to the first embodiment, with the only difference that the hooks 5 of the bumpers 3 comprise respective cavities 7. As described above, these cavities 7 are filled by an outer layer 4 suitably shaped. The outer layer 4 comprises protrusions 15 shaped so as to fit with said cavities 7, as shown in FIGS. 2C and 2D.

Figures 7A, 7B, 7C, 7D:
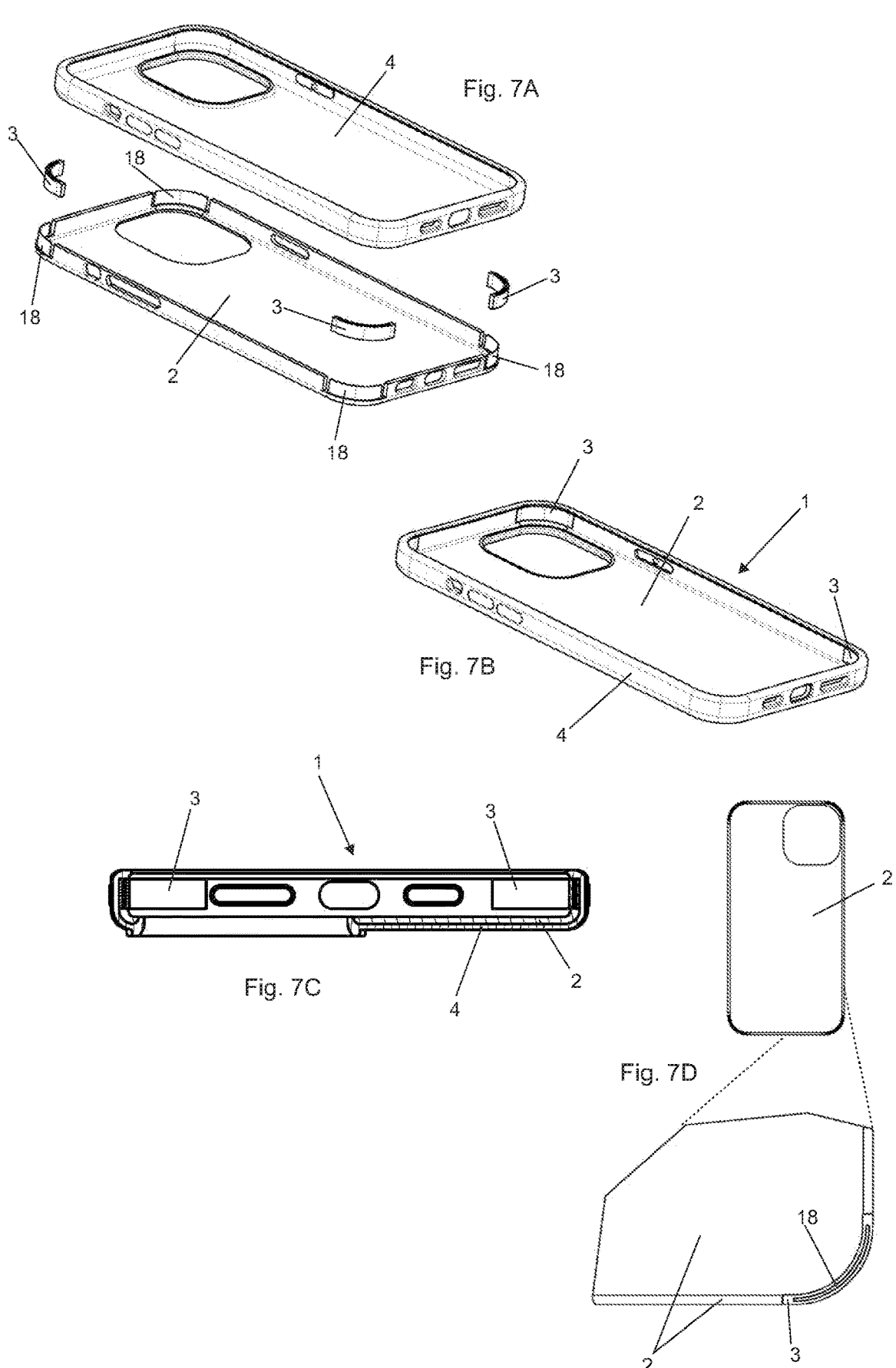
FIG. 7A shows an axonometric exploded view of a protective case according to a third embodiment of the present invention.
FIG. 7B shows an axonometric view of a protective case according to the third embodiment of the present invention.
FIG. 7C shows a lateral sectional view of the protective case of FIG. 7B.
FIG. 7D shows an front view of chassis and shock-absorbing bumpers of the third embodiment of the present invention, with a detailed view of the portion wherein the shock-absorbing bumper is installed.

The third embodiment of FIG. 7 comprises four bumpers 3 arranged in correspondence of the corners of the chassis 2. Each bumper 3 is an arc-shaped element and comprises a transversal pass-through hole, as shown in FIG. 7D. The bumpers 3 are inserted in corresponding pins 18 of the chassis 2. As shown in FIG. 7A, the bumpers 3 are frontally inserted in said pins 18. Consequently, a part of each bumper 3 faces outside and another part faces inside the chassis 2. In this embodiment, the male-female interlocking realized in all the other embodiments through a male element, the hook 5 of the bumper 3, and a female element, the groove 6 of the chassis 2, is inverted. In this embodiment, the male element is arranged on the chassis 2, thus the pin 18, and the female element is arranged on the bumper 3, thus the pass-through hole. The outer layer 4 clamp from the top the bumpers 3 avoiding they slip out from the pins 18, as shown in FIG. 7C. For the rest, the chassis 2 and the outer layer 4 are similar to those of first and second embodiments. The other features of this embodiment that are not specifically described are equal to that of first embodiment.

The fourth embodiment of FIG. 8 comprises only the chassis 2 and the bumpers 3, without an outer layer 4. The bumpers 3 are arranged so to face inward. The chassis 2 comprise four pockets wherein the bumpers 3 are accommodated. The sidewall of the bumpers 3 is shaped so to realize said hooks 5, while the shaping of the inner side of the pockets realize said grooves 6.

The fifth embodiment of FIG. 9 is substantially equal to the fourth embodiment, with the exception that the bumpers 3 are differently shaped and the grooves 6 of the chassis 2 are not blind. In particular, each bumper 3 comprises an excrescence on the outer side and two orders of hooks 5, one on the sidewall of the excrescence and one on the sidewall of the main body. Both the hooks 5 cooperate with corresponding and complementary grooves 6 of the chassis 2. Moreover, through the apertures of the chassis 2, the excrescences of the bumpers 3 are visible from outside.

The sixth embodiment of FIG. 10 is similar to the first embodiment, but the bumpers are arranged on the outer side of the chassis 2 and bumpers have hooks 5 facing inward. The corresponding recesses 13 for accommodating the bumpers 3 are provided on the outer side of the chassis 2 in correspondence of its corners. The outer layer 4 covers the bumpers 3 and the chassis 2, clamping the bumpers 3 between the outer layer 4 and the chassis 2, as shown in FIG.

10F. The other features of this embodiment that are not specifically described are equal to that of first embodiment.

Figures 11A, 11B, 11C, 11D:
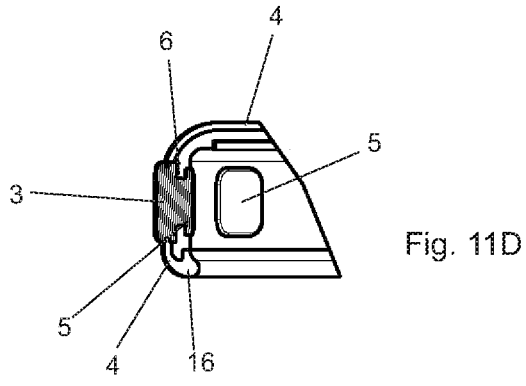
FIG. 11A shows an axonometric view of a protective case according to a seventh embodiment of the present invention.
FIG. 11B shows an exploded axonometric view of a protective case according to the seventh embodiment of the present invention.
FIG. 11C shows a front sectional view of a protective case according to the seventh embodiment of the present invention, with a detailed view of the portion wherein the shock-absorbing bumper is installed.
FIG. 11D shows a lateral detailed sectional view of a protective case according to the seventh embodiment of the present invention.

The seventh embodiment of FIG. 11 is equal to the sixth embodiment with the difference that the outer layer 4 comprises openings 14 in correspondence of its corners. These openings 14 are shaped so to make visible the bumpers 3 from outside and to lock the bumpers 3 in the grooves 6 of the chassis 2, as shown in FIG. 11D. Preferably, the bumpers 3 cross the openings 14 of the outer layer 4 as shown in FIG. 11D.

The eighth embodiment of FIG. 12 is equal to the seventh embodiment with the difference that a flat bumper 3 is arranged over the inner side of the backwall of the chassis 2. Other four bumpers 3 are arranged on the outer side of the chassis 2 in correspondence of its corners. The flat bumper 3 comprises protuberances representing the hooks 5. These hooks 5 are shaped to fit with corresponding suitably shaped holes of the backwall of the chassis 2, which represent the grooves 6 shown in FIG. 12C. In this embodiment, the flat bumper 3 comprises an array of energy-absorbing open-cells 11 encapsulated in an elastic carrier material 12, as described in the following.

In all the above-mentioned embodiments and type of interlocking, the bumper 3 is configured to absorb the energy of an impact. In particular, the bumper 3 is not simply made of an elastic full-body like those already known. The bumper 3 of the present invention comprises a highly effective energy absorber.

In particular, despite it is not specifically illustrated like in FIGS. 12A and 12B, all bumpers 3 of all embodiments can comprise an array of energy-absorbing open-cells 11 encapsulated in an elastic carrier material 12.

As shown in the detailed view of FIG. 11B, the array of energy-absorbing open-cells 11 comprises a plurality of open-cells 17 interconnected to each other via their sidewalls.

The open-cells 17 are opened at their ends so that each open-cell 17 realizes a tube.

Each open-cell 17 has a circular cross-section as represented in FIG. 11B. Alternatively, the cross-section of the open-cells 17 can be a square, a hexagon, a non-uniform hexagon, a re-entrant hexagon, a chiral truss, a diamond, a triangle or an arrowhead.

The open-cells 17 of said array can be welded to each other via their sidewalls. Alternatively, the tubes can be bonded by means of adhesive layers interposed between adjacent sidewalls. This kind of adhesive can be a thermo-adhesive material, thus an adhesive that at room temperature is solid and becomes liquid above 80-100° C.

When the open-cells 17 have a circular cross-section, the outer diameter of the circular cross-section can range between 1 and 6 mm, and the wall thickness of said open-cells 17 can range between 0.05 and 0.2 mm.

The thickness of the array 11 can range between 0.3 mm and 2 mm.

The array 11 of energy-absorbing open-cells 17 can be configured to absorb the energy through a plastic deformation of the sidewalls of the open-cells 17, wherein the term "plastic deformation" means that the sidewalls irreversibly crumple and/or stretch.

Alternatively, the array 11 can absorb the energy through an elastic deformation of the sidewalls of the open-cells 17. In the latter case, the deformation is almost completely reversible and the sidewalls come back to a shape similar or equal to the original one. This kind of elastic deformation is more efficient than that of an elastic full-body bumper, because the sidewalls can inwardly crumple allowing a deeper compression at equal heights.

The open-cells 17 can also absorb the energy acting as a mesh, so to spread the impact energy over a wider area. In this case, the interconnection between adjacent sidewalls can break, absorbing a great quantity of energy.

Alternatively, the array of energy-absorbing open-cells 11 can be realized by means of a lattice structure 8 (not shown). In this case, the open-cells are constituted by hollow portions defined by the solid portions of the lattice structure. Substantially, the three-dimensional grid of solid portions of the lattice structure defines a network of interconnected open-cells (i.e. the hollow portions of the lattice structure). These open portions of the lattice structure realize said open-cells. The lattice structure can be configured to absorb the energy through a plastic or elastic deformation of the solid portions.

The array of energy-absorbing open-cells 11 is fully encapsulated by an elastic carrier material 12, as shown in FIG. 12B. In particular, an elastic carrier material, like a silicon resin or a pourable elastomer, fully encapsulates and permeates the open cells 17 of the array 11. Preferably, the elastic carrier material 12 is a single piece. The elastic material 12 has preferably a viscosity comprises between 10.000-2.000.000 cPs, for permeating the open-cells 17 without difficulties.

The array 11 is thus completely embedded in the carrier material 12 and the risks of a separation between themselves is prevented. Furthermore, since the elastic material of the carrier 12 fills the open-cells 17, the buckling of the cells' sidewalls is laterally supported by the elastic material and synergically improves the absorption of impact energy. The surface of contact between the array 11 and the elastic carrier material 12 is also increased and consequently a disconnection between themselves is more difficult or requires more energy.

Alternatively, the shock-absorbing bumpers 3 can be at least in part made of a polymer-based dilatant. An example of this kind of material is that produced by the company named D3O.

The polymer-based dilatant can be realized according to the content of the patent EP1832186B1 that is here-in incorporated by reference with particular reference to the details and features of the self-supporting energy absorbing composite.

In a part embodiment (not shown) the protective case 1 is not an component independent from the mobile device 10, but a component of the device 10 itself. In particular, the protective case 1 of this embodiment consists of the outer shell, thus the case, of the mobile device 10.

Concluding, the invention so conceived is susceptible to many modifications and variations all of which fall within the scope of the inventive concept, furthermore all features can be substituted to technically equivalent alternatives. Practically, the quantities can be varied depending on the specific technical requirements. Finally, all features of previously described embodiments can be combined in any way, so to obtain other embodiments that are not herein described for reasons of practicality and clarity.

LEGEND 1 protective case
2 chassis
3 shock-absorbing bumper
4 outer layer
5 groove 6 hook
7 cavity
8 indent
9 undercut
10 mobile device
11 array of energy-absorbing open-cells
12 elastic carrier material
13 recess
14 opening
protrusion
16 ridge
17 open-cell
18 pin

The invention claimed is:

1. A protective case configured to reversibly receive and retain a mobile device comprising:
 a rigid chassis configured to receive the mobile device;
 a plurality of shock-absorbing bumpers shaped to interlock with respective portions of said chassis;
 an outer layer configured to cover an outer face of the rigid chassis;
 wherein the bumpers are sandwiched between the outer layer and the chassis, or
 wherein the chassis is sandwiched between the outer layer and the bumpers.

2. Protective case according to claim 1, wherein the chassis is made of a material at least partially incompatible with the material/s of the shock-absorbing bumpers and/or of the outer layer.

3. Protective case according to claim 1, wherein at least one shock-absorbing bumper comprises one or more hooks configured to snap-fasten with said portions of the chassis.

4. Protective case according to claim 3, wherein at least one shock-absorbing bumper is shaped to form a cavity.

5. Protective case according to claim 4, wherein the outer layer is shaped so as to fill one or more of said cavities of the shock-absorbing bumpers for preventing a disconnection between the shock-absorbing bumper and the chassis.

6. Protective case according to claim 3, wherein said portions being grooves.

7. Protective case according to claim 1, wherein the outer layer is overmolded over the chassis so to be in direct contact also with the shock-absorbing bumpers.

8. Protective case according to claim 1, wherein the outer layer comprises a plurality of indents configured to mechanically engage with respective undercuts of the shock-absorbing bumpers.

9. Protective case according to claim 1, wherein the chassis or outer layer is configured to retain the mobile device.

10. Protective case according to claim 1, wherein one or more of the shock-absorbing bumpers comprise an array of energy-absorbing open-cells encapsulated in an elastic carrier material.

11. Protective case according to claim 1, wherein one or more of the shock-absorbing bumpers comprise polymer-based dilatant.

12. Protective case according to claim 1, wherein one or more of shock-absorbing bumpers are made at least in part of silicone or an elastomer.

13. Protective case according to claim 12, wherein the elastomer of one or more of shock-absorbing bumpers is a thermoplastic elastomer.

14. Protective case according to claim 1, wherein the outer layer and the shock-absorbing bumpers are made of compatible materials.

15. Protective case according to claim 1, wherein the shock-absorbing bumpers are interlocked to the chassis so to face inward.

16. Protective case according to claim 1, wherein one or more of shock-absorbing bumpers are at least in part clamped between the chassis and the outer layer.

* * * * *